(12) United States Patent
Ma et al.

(10) Patent No.: US 12,454,231 B2
(45) Date of Patent: Oct. 28, 2025

(54) AUTOMOTIVE WIRE HARNESS WITH A FLEXIBLE CONNECTION SECTION

(71) Applicant: APTIV ELECTRIC SYSTEMS CO., LTD., Shanghai (CN)

(72) Inventors: Bokui Ma, Shanghai (CN); Zhanggang Li, Shanghai (CN)

(73) Assignee: APTIV ELECTRIC SYSTEMS CO., LTD., Shanghai (CN)

( * ) Notice: Subject to any disclaimer, the term of this patent is extended or adjusted under 35 U.S.C. 154(b) by 62 days.

(21) Appl. No.: 18/230,258

(22) Filed: Aug. 4, 2023

(65) Prior Publication Data

US 2024/0051478 A1 Feb. 15, 2024

(30) Foreign Application Priority Data

Aug. 11, 2022 (CN) .......................... 202210963685.4

(51) Int. Cl.
*B60R 16/02* (2006.01)
*H01B 1/02* (2006.01)

(52) U.S. Cl.
CPC ......... *B60R 16/0207* (2013.01); *H01B 1/023* (2013.01)

(58) Field of Classification Search
None
See application file for complete search history.

(56) References Cited

U.S. PATENT DOCUMENTS

| | | | | |
|---|---|---|---|---|
| 2014/0354043 | A1* | 12/2014 | Biesse | H01R 43/16 228/101 |
| 2015/0136479 | A1* | 5/2015 | Oga | H01B 1/023 174/72 A |
| 2018/0118137 | A1* | 5/2018 | Tsukamoto | B60R 16/0215 |
| 2019/0126861 | A1* | 5/2019 | Nakai | H02G 3/04 |
| 2020/0339047 | A1* | 10/2020 | Shao | B60R 16/0222 |

FOREIGN PATENT DOCUMENTS

| | | |
|---|---|---|
| CN | 114566309 A | 5/2022 |
| WO | 2021188438 A1 | 9/2021 |

* cited by examiner

*Primary Examiner* — Krystal Robinson
(74) *Attorney, Agent, or Firm* — Billion & Armitage

(57) ABSTRACT

The present application discloses an automotive wire harness with a flexible connection section. An automotive wire harness in accordance with the present application comprises: a conductive segment having of a rigid conductor; a first connector connected to a first end of the rigid conductor; a second connector connected to a second end of the rigid conductor; and a flexible connection section, the flexible connection section is to connect the first end of the rigid conductor and the first connector. The automotive wire harness may be an automotive charging wire harness. The rigid aluminum conductor may be an aluminum busbar or an aluminum rod.

19 Claims, 18 Drawing Sheets

AUTOMOTIVE WIRE HARNESS WITH A FLEXIBLE CONNECTION SECTION

CROSS-REFERENCE TO RELATED APPLICATION

This application claims benefit of priority to Chinese Patent Application No. 202210963685.4 filed on Aug. 11, 2022, the entire disclosure of which is hereby incorporated by reference.

TECHNICAL FIELD OF THE INVENTION

The present patent application relates to an automotive wire harness, and in particular to a wire harness for delivering electric power from the charging socket of an electric vehicle to a battery pack.

BACKGROUND

Electric vehicles, typified by pure electric vehicles (EVs) and plug-in hybrid electric vehicles (PHEVs), are replacing traditional internal combustion engine powered vehicles. Such electric vehicles typically carry a battery pack in the chassis and transfer power from the charging socket to the battery pack using a harness/cable suitable for high current transmission.

FIG. 1 illustrates a quick charge harness 100 suitable for an electric vehicle, wherein the charging base connector 110 at one end of the harness 100 is used for connecting with an external charging plug (not shown), and the battery connector 120 at the other end of the harness 100 is used for connecting with a battery pack or a distribution box of the battery pack. A plurality of copper wires 130 are used for transferring power.

The charging base connector 110 is generally provided on the side of the vehicle body, such as at the left or right rear of the body, near the rear wheels. The battery pack is typically provided on the chassis of the vehicle body. Thus, the copper wires between the charging base connector and the battery pack usually have a relatively large length. Since copper is a dense material and has a high cost, the weight and manufacturing cost of the copper wires in the wire harness 100 shown in FIG. 1 both would affect the development needs of electric vehicles to reduce cost and weight.

In order to meet the requirements of quick charging, the copper wires are usually thick, e.g., with a cross-section of 70 $mm^2$ to 95 $mm^2$. In addition, as is shown in FIG. 1, several wire slots 140 or other similar positioning mechanisms are provided along the length of the copper wires 130 to ensure that the copper wires 130 can be arranged and positioned in a manner that conforms to the space of the vehicle body and to provide a protective effect for the copper wires. These wire slots 140 would further occupy the space of the vehicle body.

Since aluminum is less dense than copper, aluminum conductors are increasingly used in charging harness solutions for electric vehicles, and accordingly, there is a demand for developing an aluminum charging harness with stable, reliable performance and reasonable cost and corresponding connection and positioning technology.

SUMMARY

In accordance with a first aspect of the present application, an automotive wire harness with a flexible connection section is proposed, which comprises: a conductive segment having of a rigid conductor, a first connector connected to a first end of the rigid conductor, a second connector connected to a second end of the rigid conductor, and a flexible connection section. The flexible connection section connects the first end of the rigid conductor and the first connector.

In the above-mentioned automotive wire harness solution, as an optional implementation, the rigid conductor is rigid aluminum conductor.

In the above-mentioned automotive wire harness solution, as an optional implementation, the automotive wire harness is an automotive charging wire harness.

In the above-mentioned automotive wire harness solution, as an optional implementation, the automotive wire harness further comprises an additional flexible connection section to be used to connect the second end of the rigid conductor to the second connector.

In the above-mentioned automotive wire harness solution, as an optional implementation, the first connector is a charging base connector.

In the above-mentioned automotive wire harness solution, as an optional implementation, the second connector is a battery connector.

In the above-mentioned automotive wire harness solution, as an optional implementation, the flexible connection section comprises a flexible conductor and an insulating layer.

In the above-mentioned automotive wire harness solution, as an optional implementation, the flexible conductor comprises a braided wire.

In the above-mentioned automotive wire harness solution, as an optional implementation, the flexible conductor comprises a laminate of copper foil or aluminum foil.

In the above-mentioned automotive wire harness solution, as an optional implementation, the flexible conductor comprises a flat copper wire or an aluminum wire.

In the above-mentioned automotive wire harness solution, as an optional implementation, the flat copper wire or aluminum wire comprises a plurality of copper filaments or aluminum filaments.

In the above-mentioned automotive wire harness solution, as an optional implementation, the rigid conductor is a conductive busbar or a conductive rod.

In the above-mentioned automotive wire harness solution, as an optional implementation, the rigid aluminum conductor is an aluminum busbar or an aluminum rod.

In the above-mentioned solution that the rigid aluminum conductor is an aluminum busbar, a copper cable is connected out of the terminal end of the charging base connector, and an end of the copper cable is soldered with a first end of the aluminum busbar.

In the above-mentioned solution that the rigid aluminum conductor is an aluminum busbar, a copper cable is connected out of the terminal end of the battery connector, and an end of the copper cable is soldered with a second end of the aluminum busbar.

In the above-mentioned solution that the rigid aluminum conductor is an aluminum busbar, the automotive wire harness further comprises a pass-through grommet mounted to a sheet metal structure, wherein after passing through the pass-through grommet, the copper cable connected out of the terminal end of the charging base connector is soldered to the first end of the aluminum busbar.

In the above-mentioned solution that the rigid aluminum conductor is an aluminum busbar, the aluminum busbar has a rectangular cross-section and comprises a flat solid aluminum core, an insulating layer, a wire harness shielding layer and a protecting layer.

In the above-mentioned solution that the rigid aluminum conductor is an aluminum rod, a copper cable is connected out of the terminal end of the charging base connector, and an end of the copper cable is soldered with a first end of the aluminum rod.

In the above-mentioned solution the rigid aluminum conductor is an aluminum rod, a copper cable is connected out of the terminal end of the battery connector, and an end of the copper cable is soldered with a second end of the aluminum rod.

In the above-mentioned solution that the rigid aluminum conductor is an aluminum rod, the automotive wire harness further comprises a pass-through grommet mounted to a sheet metal structure, wherein after passing through the pass-through grommet, the copper cable connected out of the terminal end of the charging base connector is soldered to the first end of the aluminum rod.

In the above-mentioned solution that the rigid aluminum conductor is an aluminum rod, the aluminum rod has a circular cross-section and comprises a circular solid aluminum core, an insulating layer, a wire harness shielding layer.

BRIEF DESCRIPTION OF THE DRAWINGS

The present invention is now described, by way of example with reference to the accompanying drawings, in which:

FIG. 2B is connected to a copper conductor according to some embodiments;

FIG. 6B is connected to a copper conductor according to some embodiments;

DETAILED DESCRIPTION

Figure 1:
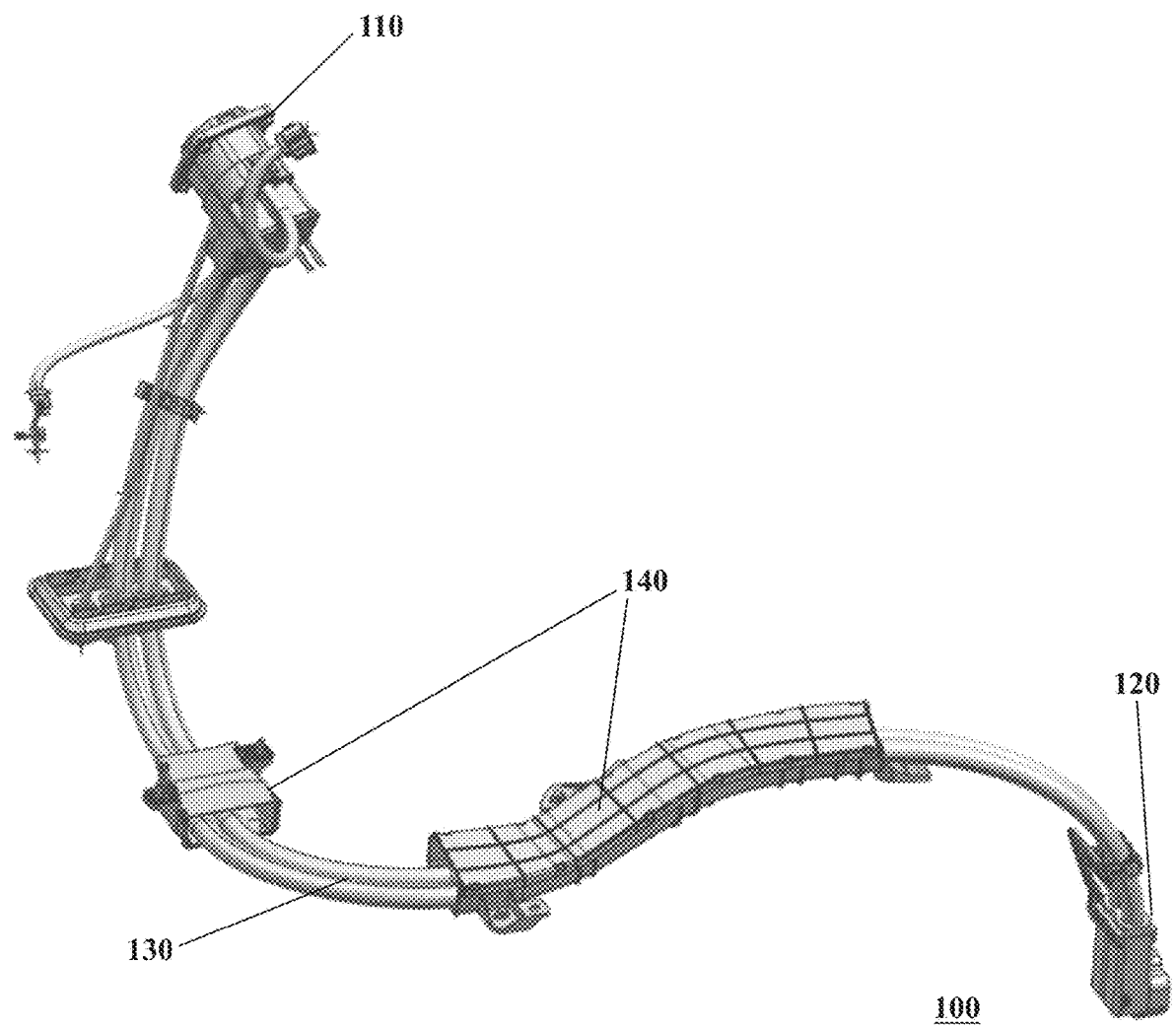
FIG. 1 shows a prior copper cables-based charging wire harness according to some embodiments.

In the following description, the present patent application will be described with reference to various embodiments. However, those skilled in the art will recognize that various embodiments may be implemented without one or more specific details or in conjunction with other alternative and/or additional methods, materials, or components. In other cases, well-known structures, materials, or operations are not shown or described in detail to avoid obscuring aspects of various embodiments of the present patent application. Similarly, for the purpose of explanation, specific quantities, materials, and configurations are set forth in order to provide a full understanding of embodiments of the present patent application. However, the present patent application may be implemented without specific details. In addition, it is understood that various embodiments shown in the drawings are illustrative and are not necessarily drawn to scale.

For the purposes of the present disclosure, the phrase "A and/or B" is intended to mean either (A), (B), or (A and B). For the purposes of the present disclosure, the phrase "A, B and/or C" is intended to mean either (A), (B), (C), (A and B), (A and C), (B and C), or (A, B and C).

For the purposes of the present disclosure, references to "one embodiment," "an embodiment," "an example embodiment," etc., indicate that the embodiment described may include a particular feature, structure, or characteristic, but each embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiment whether or not explicitly described.

The embodiments and variations of the present patent application are further described below in conjunction with the drawings.

Example 1—Aluminum Busbar-Based Charging Wire Harness

Figure 2A:
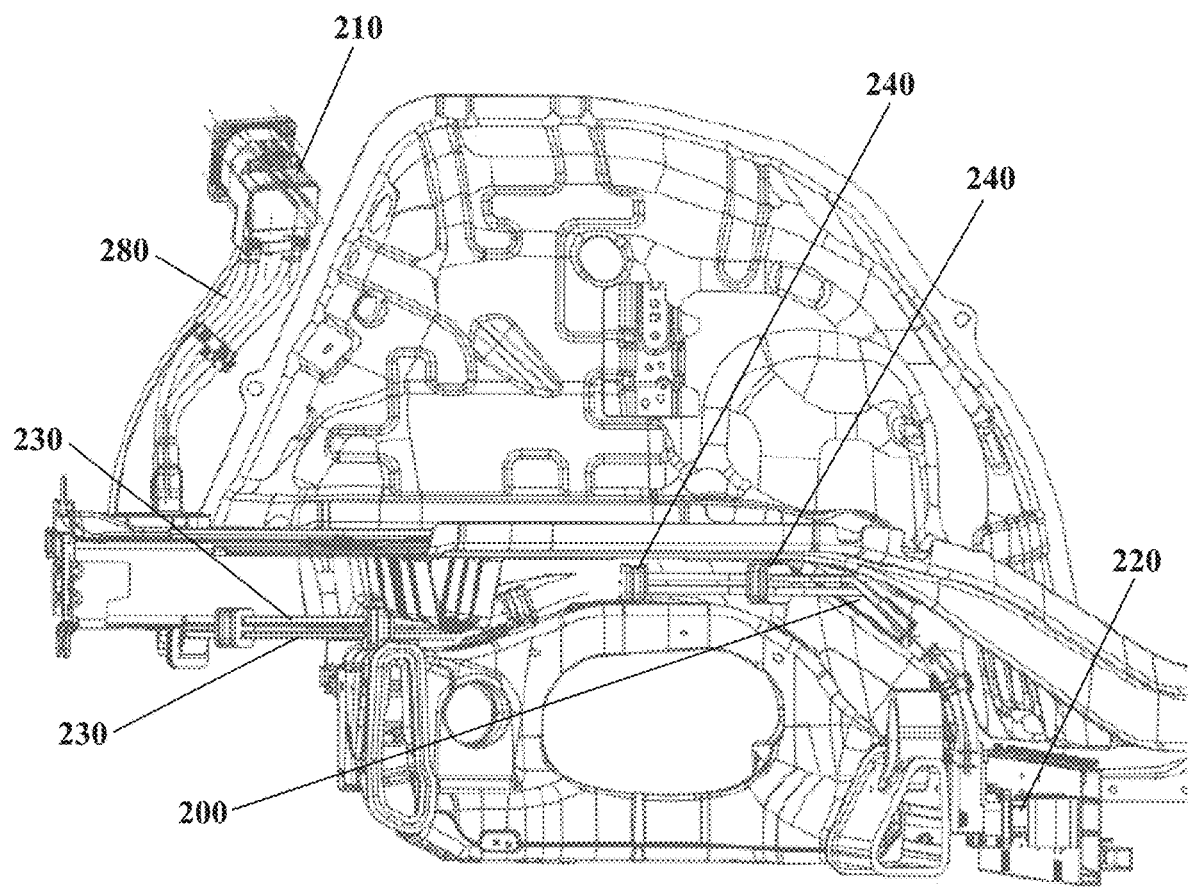
FIG. 2A shows an exemplary aluminum busbar-based charging wire harness and the vehicle body sheet metal structure at the location where the charging wire harness is mounted according to some embodiments.
Figure 2B:
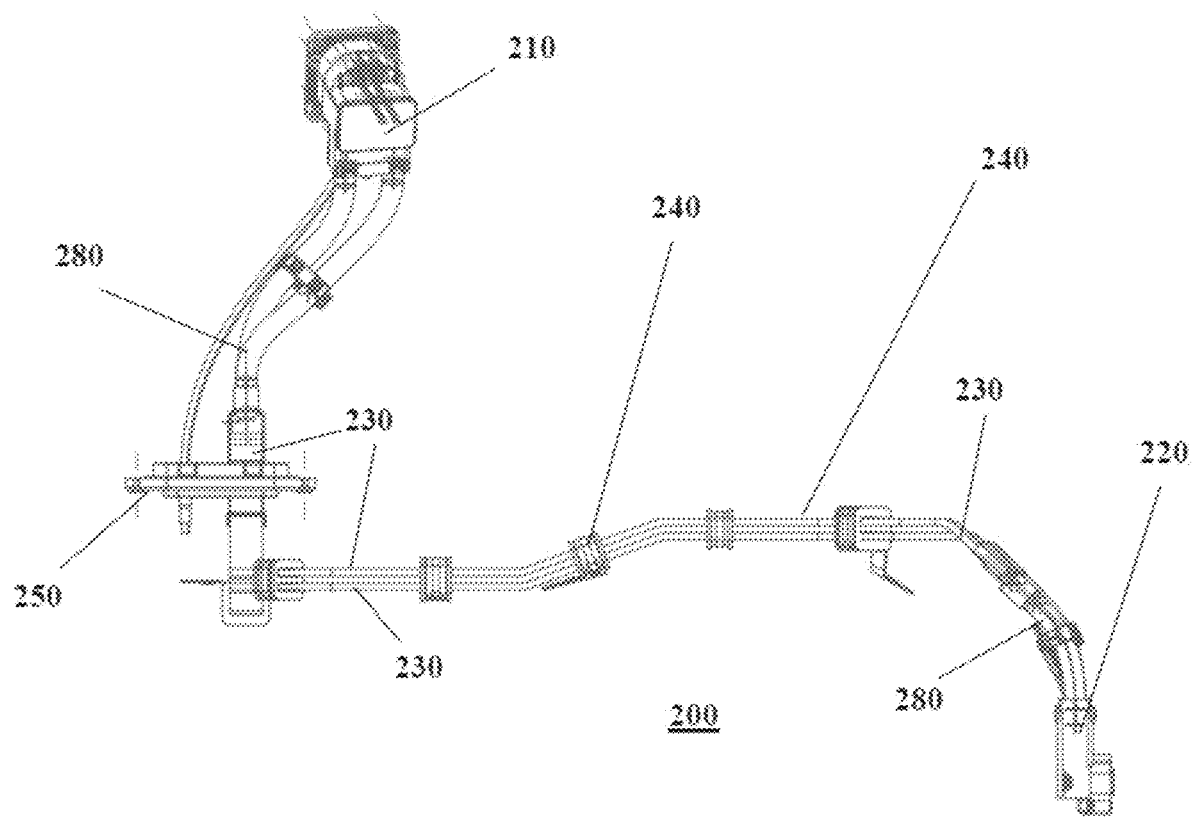
FIG. 2B shows a charging wire harness which is the same as that shown in FIG. 2A, but with the vehicle body sheet metal part in the background thereof removed according to some embodiments.
Figure 2C:
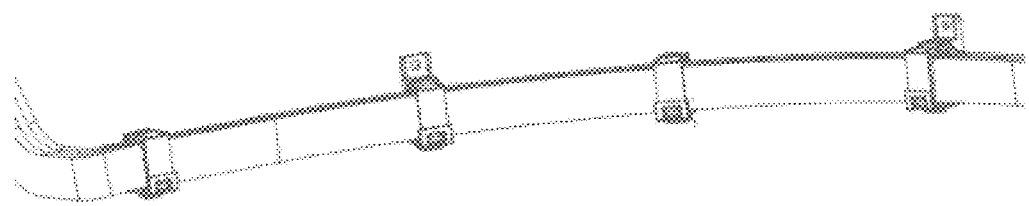
FIG. 2C shows the aluminum busbar part of the charging wire harness shown in FIG. 2B according to some embodiments.

FIG. 2A shows an exemplary charging wire harness 200 and the vehicle body sheet metal structure at the location where the charging wire harness 200 is mounted. FIG. 2B shows a charging wire harness 200 which is the same as that shown in FIG. 2A, but with the vehicle body sheet metal part in the background thereof removed. FIG. 2C shows the aluminum busbar part of the charging wire harness 200 shown in FIG. 2B.

As is shown in FIGS. 2A-2C, charging wire harness 200 includes two busbars formed of aluminum (hereafter referred to as aluminum busbars 230), which can be pre-formed into a particular shape to accommodate installation within the vehicle body. The terminal ends of the charging base connector 210 and the battery connector 220 at both ends of the wire harness are still connected with a copper cable 280, and then both ends of the aluminum busbar 230 form an electrical connection with the copper conductors in the copper cable 280 at the terminal ends of the two connectors described above, thus completing the electrical transmission path from the charging socket to the battery pack/battery pack wiring box. The aluminum busbar 230 is positioned on the vehicle body sheet metal with several positioning elements 240, which are different from the wire slots 140 in FIG. 1, having a small space volume. The pass-through grommet 250 can further play a role in positioning/limiting.

The vehicle body sheet metal shown in FIG. 2A is a right rear vehicle body sheet metal member (viewed from the inside of the vehicle toward the outside of the vehicle), but this sheet metal structure is merely taken as an example. In practical applications, the charging base connector 210 and the battery connector 220 may be located in any position that meets the design requirements of the vehicle.

Figure 3:
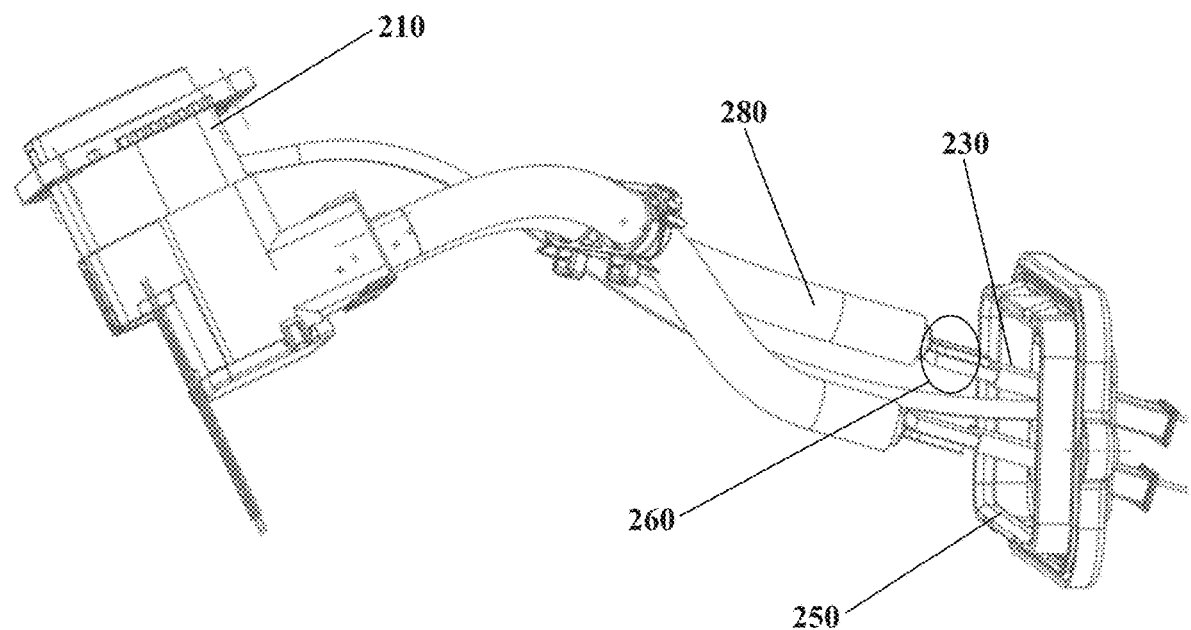
FIG. 3 shows an implementation wherein the aluminum busbar used in FIG. 2A

FIG. 3 shows an implementation of the connection of the aluminum busbar 230 to the copper conductor. As is shown in FIG. 3, a copper cable 280 is mounted at the terminal end of the charging base connector 210. The aluminum busbar 230 passes through the pass-through grommet 250, and then its flat end and the flat end of the copper cable 280 are soldered together by a technique such as wave soldering.

Further, the weld between the aluminum busbar 230 and the copper cable 280 (e.g., the area indicated with the reference numeral 260 in FIG. 3) is protected hermetically with a heat shrink tube.

Figure 4:
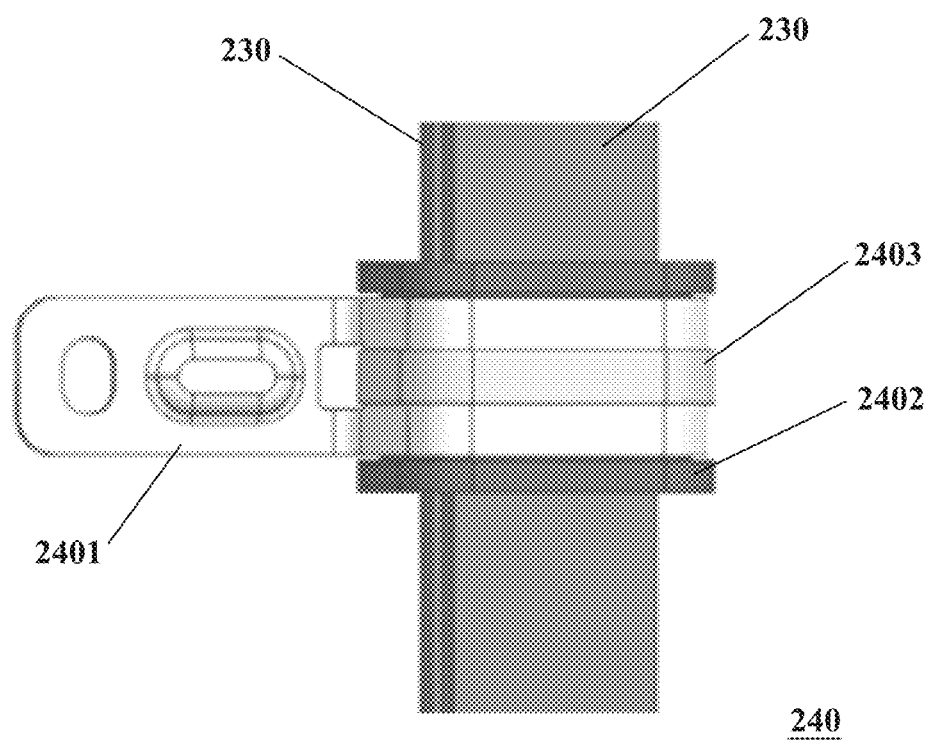
FIG. 4 shows an example of the positioning element used in FIG. 2A and FIG. 2B according to some embodiments.

FIG. 4 shows an example of the positioning element 240 used in FIG. 2A and FIG. 2B. As is shown in FIG. 4, the two aluminum busbars 230 both pass through a hoop ring 2402 made of rubber, and one end of a metal bracket 2401 is placed around the hoop ring 2402 and fastened with a tie 2403. The metal bracket 2401 is provided with locating hole to allow it to be secured to the vehicle body sheet metal.

Figure 5:
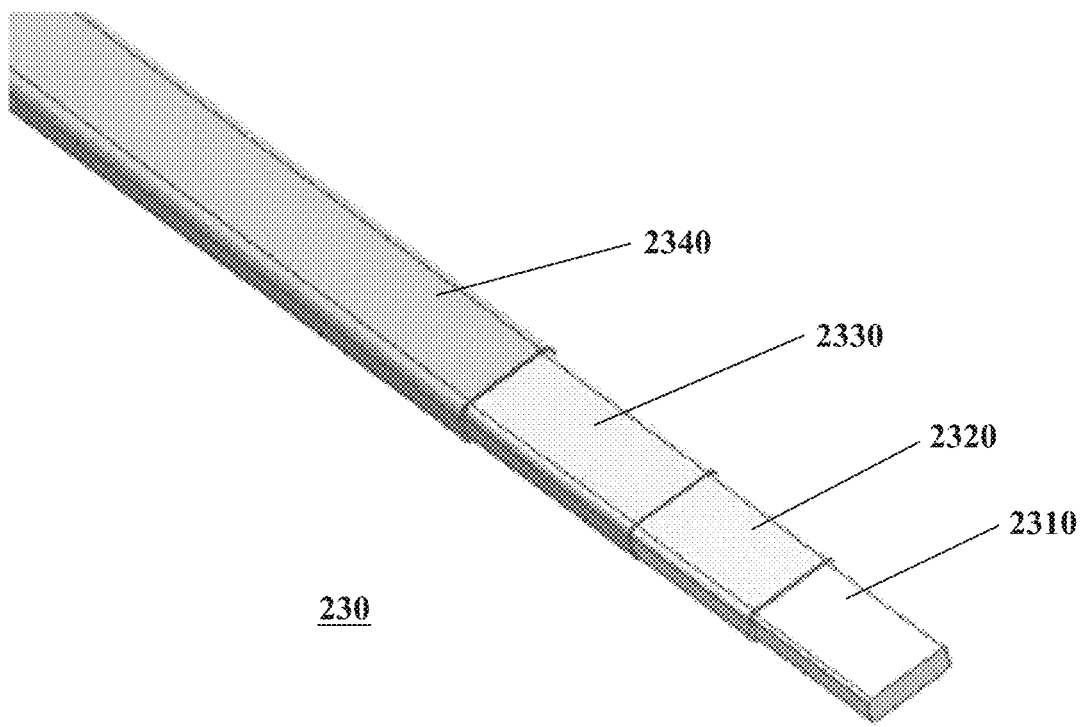
FIG. 5 shows a laminate configuration of the aluminum busbar suitable for the implementation shown in FIG. 2A according to some embodiments.

FIG. 5 shows a laminate configuration of the aluminum busbar 230 suitable for embodiments. As is shown in FIG. 5, the aluminum busbar may comprise a flat solid aluminum core 2310, an insulating layer 2320, a wire harness shielding layer 2330, and a protecting layer 2340. The flat solid aluminum core 2310 may have a cross section of 120 mm$^2$. The insulating layer 2320 may be extruded with polyamide (PA12, NYLON 12), cross-linked polyethylene (XLPE) or polyvinyl chloride (PVC) materials. The wire harness shielding layer 2330 may be a braided layer, a braided sleeve, or wound with an aluminum or copper tape. The protecting layer 2340 may be a sleeve or a pipe.

By replacing the copper cable with the aluminum busbar, compared with the copper cable with the same length as the aluminum busbar, the aluminum busbar that meet charging requirements has a significant advantage in weight and cost reduction. An example application is shown in Table 1 and Table 2 below.

TABLE 1

| | 95 mm$^2$ Copper Cable | 120 mm$^2$ Aluminum Busbar | Weight Reduction |
|---|---|---|---|
| Length of Busbar | 1 m | 1 m | N/A |
| Weight (conductors) | 1187 g/m | 324 g/m | N/A |
| Weight (insulating, shielding, protecting) | | 159 g/m | N/A |
| Total Weight of the Busbar | 1.187 Kg | 0.483 Kg | 0.704 Kg |
| Percentage of Weight Saved | N/A | N/A | 59% |

TABLE 2

| | 95 mm$^2$ Copper Cable | 120 mm$^2$ Aluminum Busbar | Cost Reduction |
|---|---|---|---|
| Length of Busbar | 1 m | 1 m | N/A |
| Percentage of Material Cost | 100% | 31% | 69% |

Meanwhile, since the aluminum busbar 230 has a high degree of rigidity, a relatively small positioning element 240, such as that shown in FIG. 4, can be used instead of the conventional wire slot for copper cable, thus saving space within the vehicle.

Thus, the wire harness made of an aluminum busbar instead of the copper cable has a very positive significance in the industry.

Example 2—Aluminum Rod-Based Charging Wire Harness

Figure 6A:
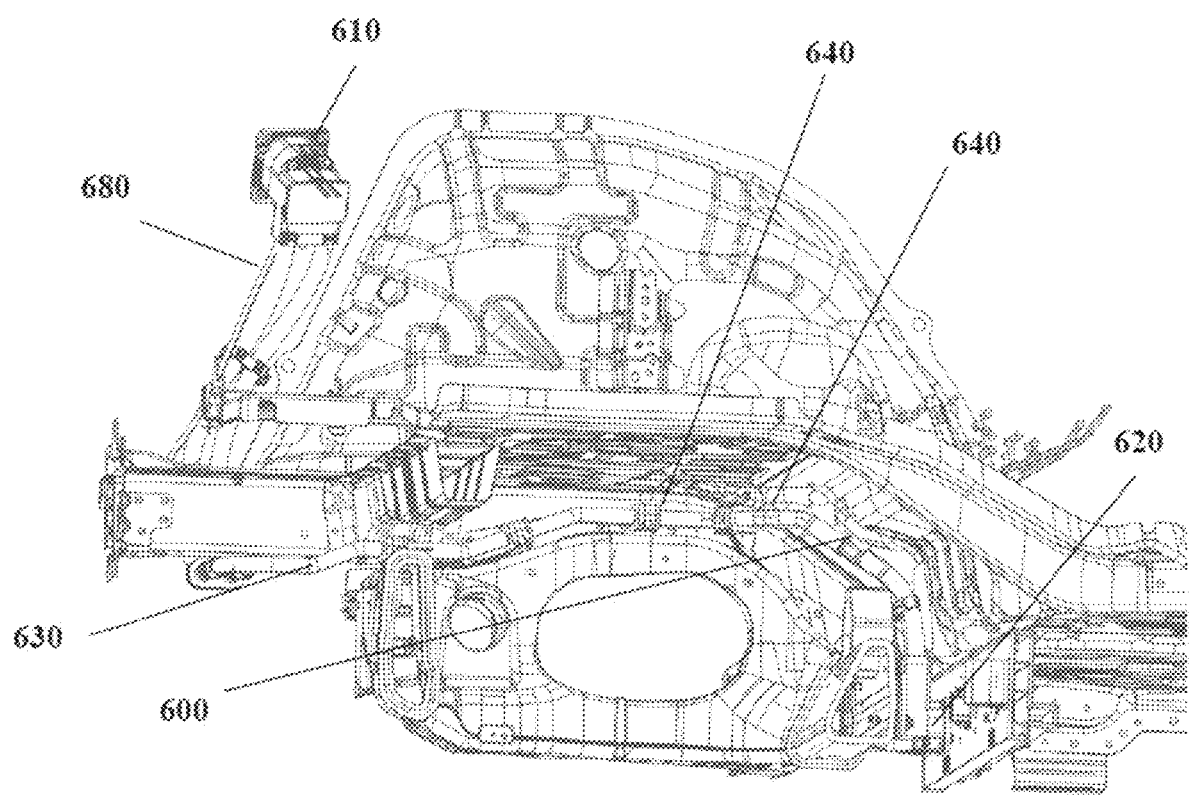
FIG. 6A shows an exemplary aluminum rod-based charging wire harness and the vehicle body sheet metal structure at the location where the charging wire harness is mounted according to some embodiments.
Figure 6B:
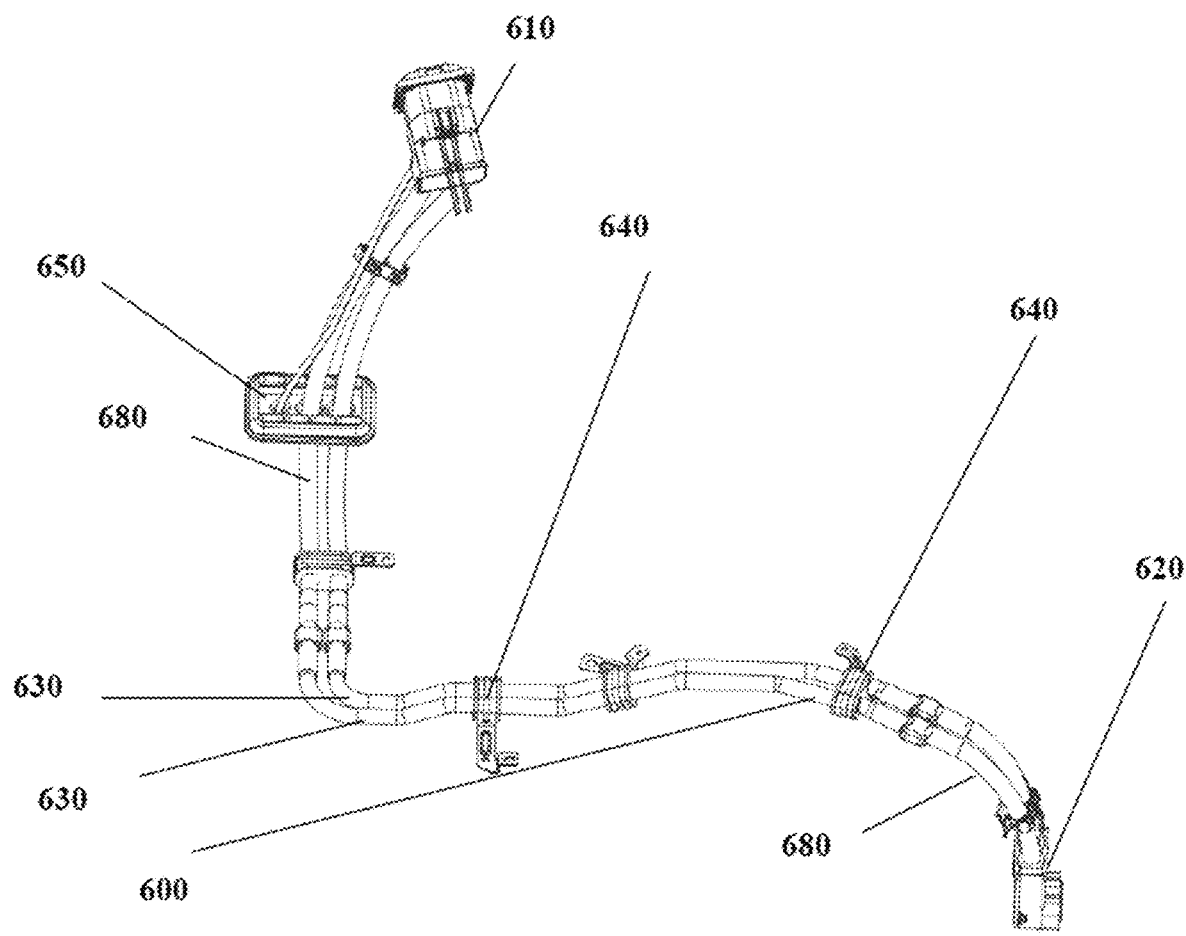
FIG. 6B shows a charging wire harness which is the same as that shown in FIG. 6A, but with the vehicle body sheet metal part in the background thereof removed according to some embodiments.
Figure 6C:
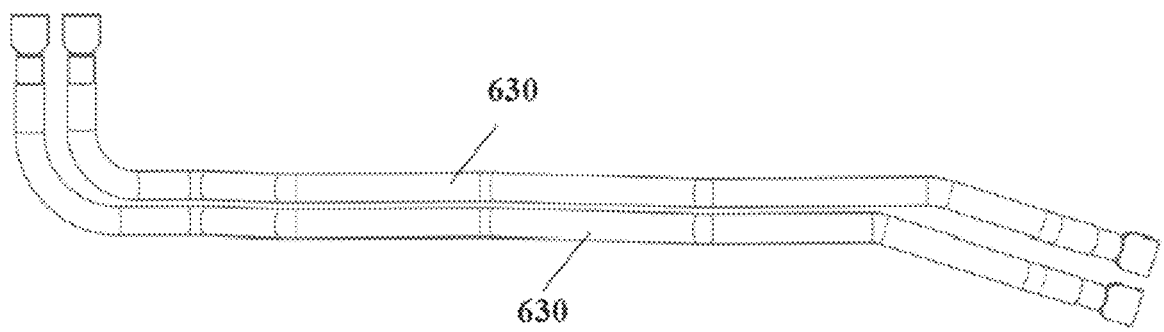
FIG. 6C shows the aluminum rod part of the charging wire harness shown in FIG. 6B according to some embodiments.

FIG. 6A shows an exemplary charging wire harness 600 and the vehicle body sheet metal structure at the location where the charging wire harness 600 is mounted. FIG. 6B shows a charging wire harness 600 which is the same as that shown in FIG. 6A, but with the vehicle body sheet metal part in the background thereof removed. FIG. 6C shows an aluminum rod 630 in the charging wire harness with the positioning element and the connectors at both ends, etc., removed.

As is shown in FIGS. 6A-6B, charging wire harness 600 includes two aluminum rods 630, which are pre-formed into a particular shape to accommodate installation within the vehicle body. The terminal ends of the charging base connector 610 and the battery connector 620 at both ends of the wire harness are still connected with copper cables 680, and then both ends of the aluminum rod 630 form an electrical connection with the copper conductors in the copper cables 680 at the terminal ends of the two connectors described above, thus completing the electrical transmission path from the charging socket to the battery pack/battery pack wiring box. The aluminum rod 630 is positioned on the vehicle body sheet metal with several positioning elements 640 (different from the wire slots 140 in FIG. 1) having a small space volume. The pass-through grommet 650 can further play a role in positioning/limiting.

The vehicle body sheet metal shown in FIG. 6A is a right rear vehicle body sheet metal member (viewed from the inside of the vehicle toward the outside of the vehicle), but this sheet metal structure is merely taken as an example. In practical applications, the charging base connector 610 and the battery connector 620 may be located in any position that meets the design requirements of the vehicle.

Figure 7:
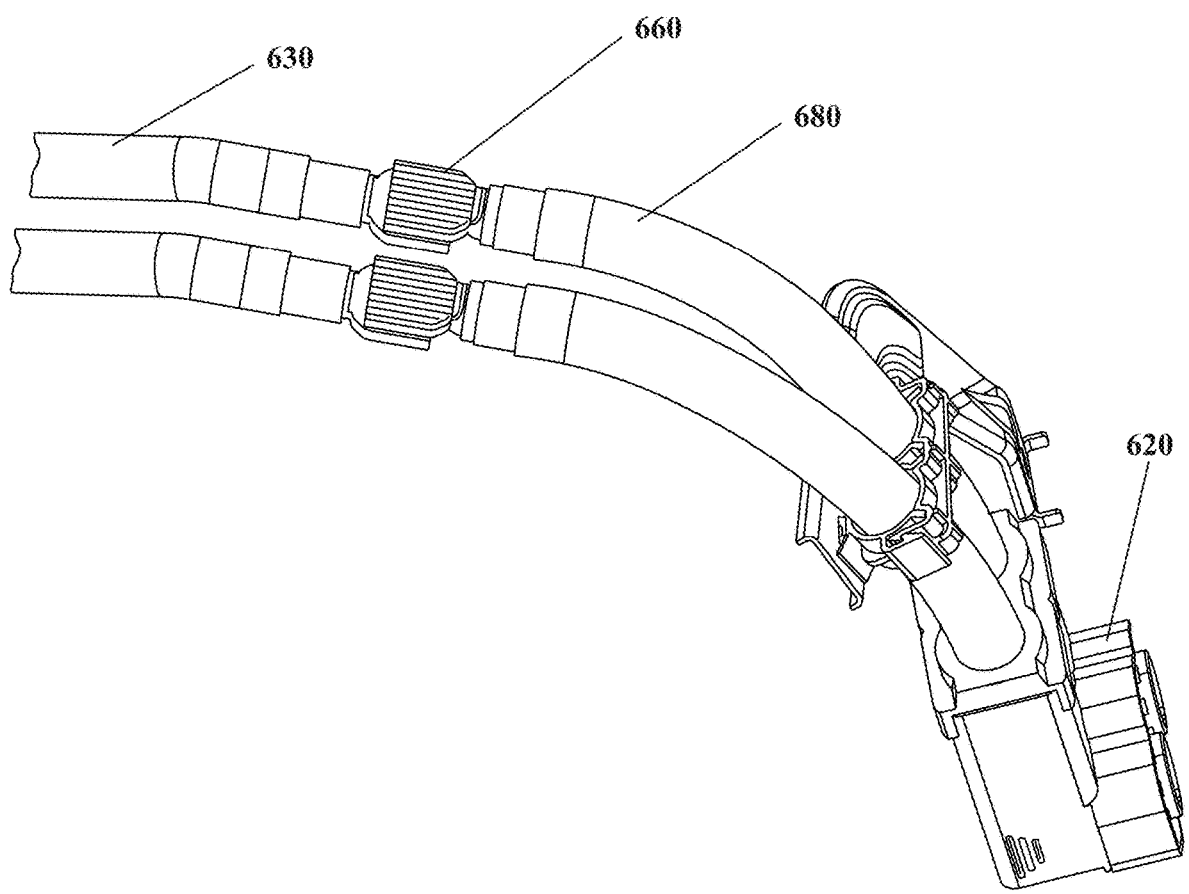
FIG. 7 shows an implementation wherein the aluminum rod used in FIG. 6A

FIG. 7 shows an implementation of the connection of the aluminum rod 630 to the copper conductor. As is shown in FIG. 7, a copper cable 680 is mounted at the terminal end of the battery connector 620. The flat end of the aluminum rod 630 and the flat end of the copper cable 680 are soldered together by a technique such as wave soldering.

Further, the weld between the aluminum rod 630 and the copper cable 680 (e.g., the area indicated with the reference numeral 660 in FIG. 7) is protected hermetically with a heat shrink tube.

Figure 8:
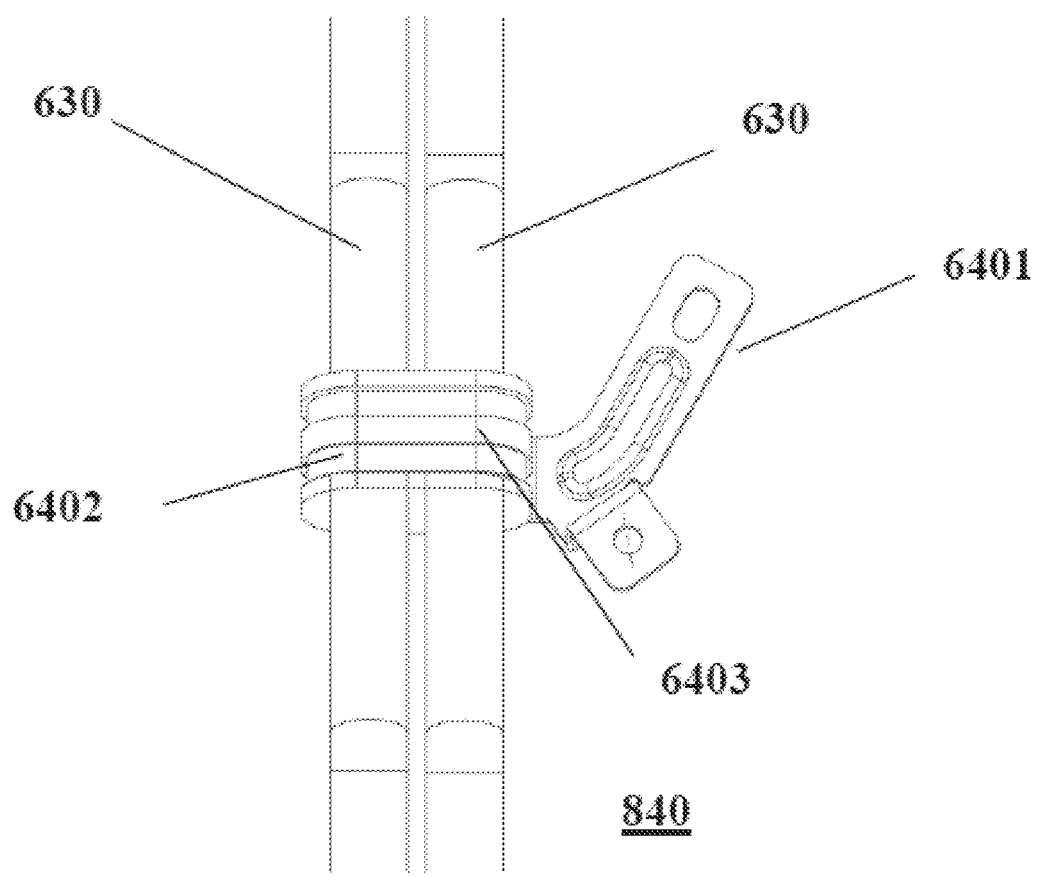
FIG. 8 shows an example of the positioning element used in FIG. 6A and FIG. 6B according to some embodiments.

FIG. 8 shows an example of the positioning element 640 used in FIG. 6A and FIG. 6B. As is shown in FIG. 8, the two aluminum rods 630 both pass through a hoop ring 6402 made of rubber, and one end of a metal bracket 6401 is placed around the hoop ring 6402 and fastened with a tie 6403. The metal bracket 6401 is provided with locating holes to allow it to be secured to the vehicle body sheet metal.

Figure 9:
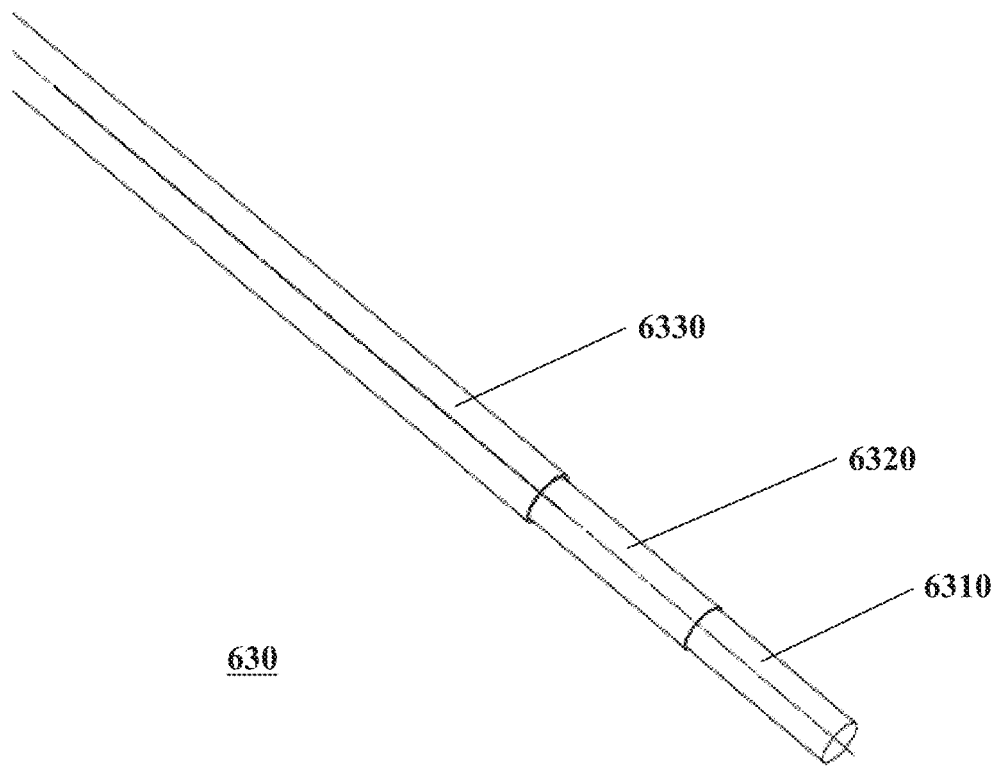
FIG. 9 shows a laminate configuration of the aluminum rod suitable for the embodiments according to some embodiments.

FIG. 9 shows a laminate configuration of the aluminum rod 630 suitable for embodiments. As is shown in FIG. 9, the aluminum rod may comprise a solid aluminum core 6310 with a circular shape, an insulating layer 6320, and a wire harness shielding layer 6330. There can also be a protecting layer or protecting cover (not shown). The solid aluminum core 6310 with a circular shape may have a cross section of 120 mm$^2$. The insulating layer 6320 may be extruded with PA12, XLPE or PVC materials. The wire harness shielding layer 6330 may be a braided layer, a braided sleeve, or wound with an aluminum or copper tape. A protective layer may also be added, which may be a sleeve or a pipe.

Similar with the aluminum busbar-based wire harness, the wire harness made of an aluminum rod instead of the copper cable also has a very positive significance in the industry.

Example 3—a Flexible Connection Section Between the Aluminum Busbar or Aluminum Rod and the Copper Cable One embodiment of the present patent application relates to a flexible connection section between the aluminum busbar or aluminum rod and the copper cable, such a flexible connection section facilitating the elimination of the mounting tolerances of the aluminum busbar or rod which is relatively rigid.

When adopting the approach described above wherein the charging wire harness is made of an aluminum busbar or aluminum rod instead of a copper cable, the aluminum busbar or aluminum rod has a relatively high degree of rigidity. When the rigid aluminum busbar or aluminum rod is installed, due to the limitations of fabrication accuracy and installation accuracy, there may be a tolerance between the actual positioning and the design positioning of the ends, which affects the accuracy of the spacing between the aluminum busbar or aluminum rod and the connectors. In order to overcome the problem identified, embodiments of the present application propose a solution to add a flexible connection section between the rigid conductor and the connector.

Figure 10A:
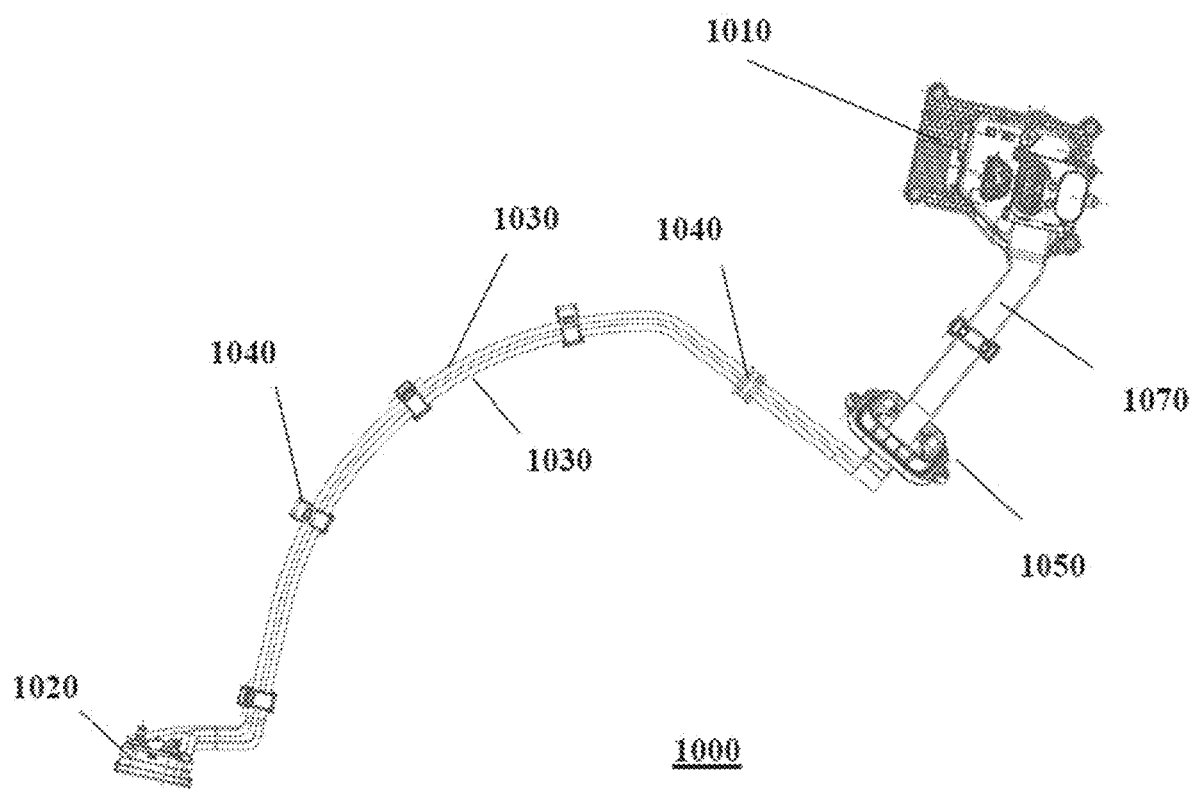
FIG. 10A shows a wire harness comprising an aluminum busbar and a flexible connection section according to the present application according to some embodiments.

FIG. 10A shows a wire harness 1000 comprising an aluminum busbar and a flexible connection section. The charging wire harness 1000 includes two aluminum-made busbars 1030 (or simply aluminum busbars), which can be pre-formed into a particular shape to accommodate installation within the vehicle body. When installed in place, both ends of the aluminum busbars 1030 form a direct or indirect electrical connection with the charging base connector 1010 and the battery connector 1020. The aluminum busbars 1030 is positioned on the vehicle body sheet metal with several positioning elements 1040 having a small space volume. The pass-through grommet 1050 can further play a role in positioning/limiting. The aluminum busbars 1030 and the charging base connector 1010 are respectively connected to a flexible connection section 1070, thereby realizing a flexible connection between the aluminum busbars 1030 and the charging base connector 1010.

Figure 10B:
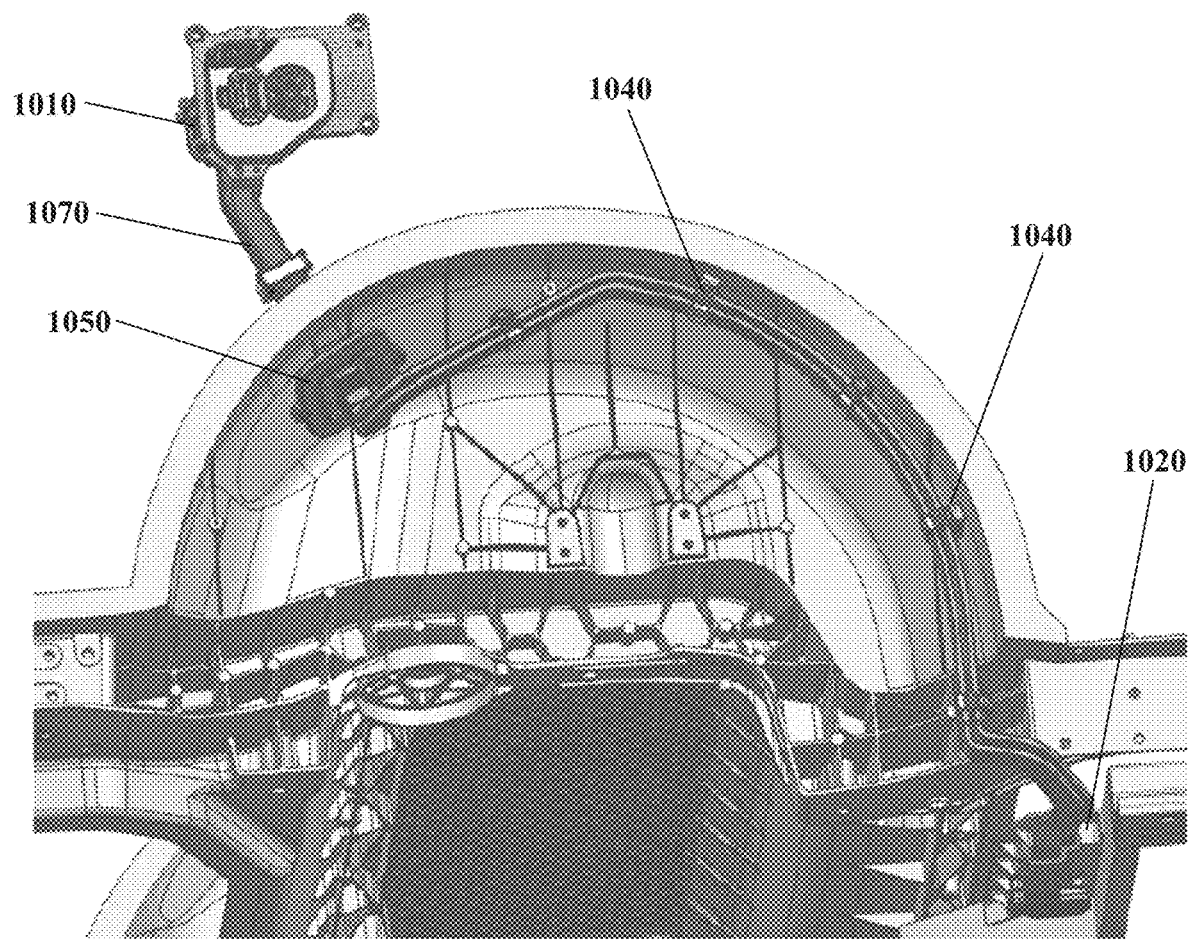
FIG. 10B shows the wire harness shown in FIG. 10A when particularly applied in a vehicle body sheet metal according to some embodiments.

FIG. 10B shows the wire harness 1000 in FIG. 10A when particularly applied in a vehicle body sheet metal.

Figure 11:
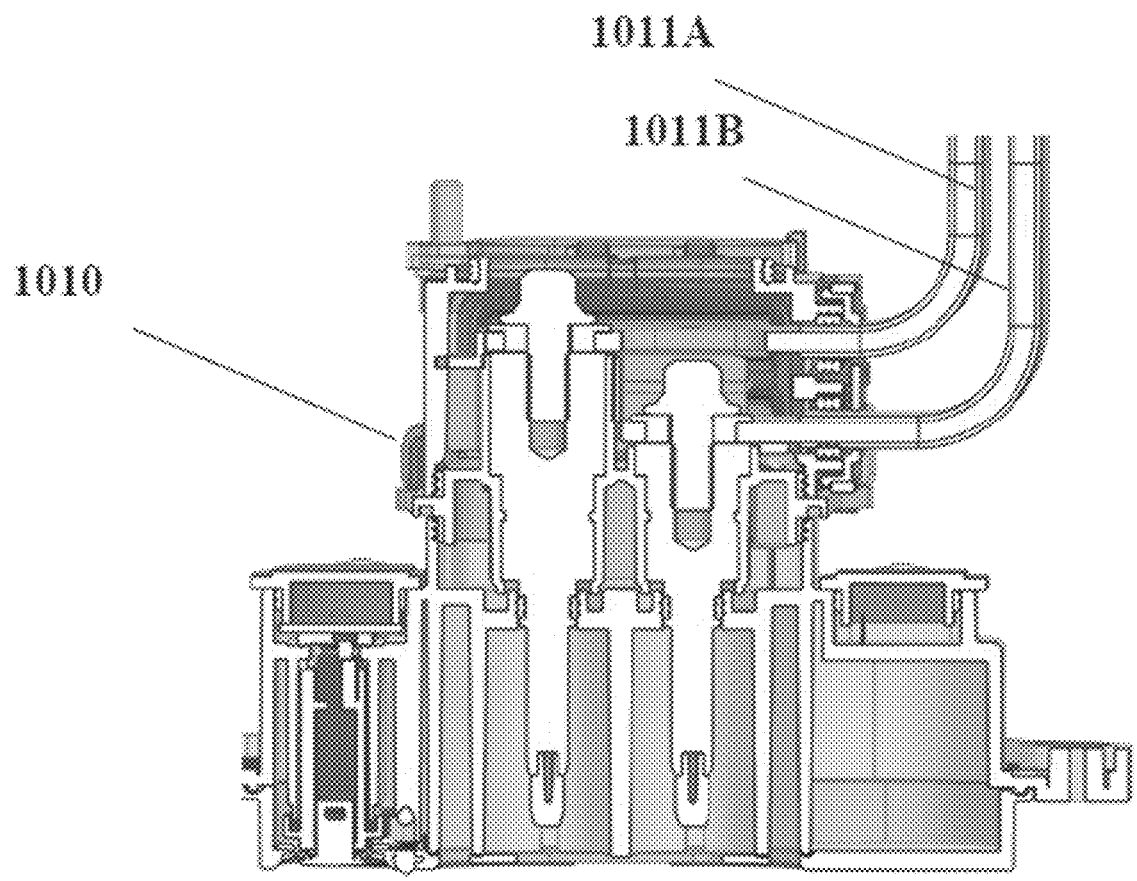
FIG. 11 shows a cross-sectional view of the charging base connector used in FIG. 10A according to some embodiments.

FIG. 11 shows a cross-sectional view of the charging base connector 1010 in FIG. 10A. As is shown in FIG. 11, the terminal ends of the charging base connector 1010 are provided with two copper sheet terminals 1011A and 1011B that will be used to form electrical connection with the flexible connection section 1070.

Figure 12A:
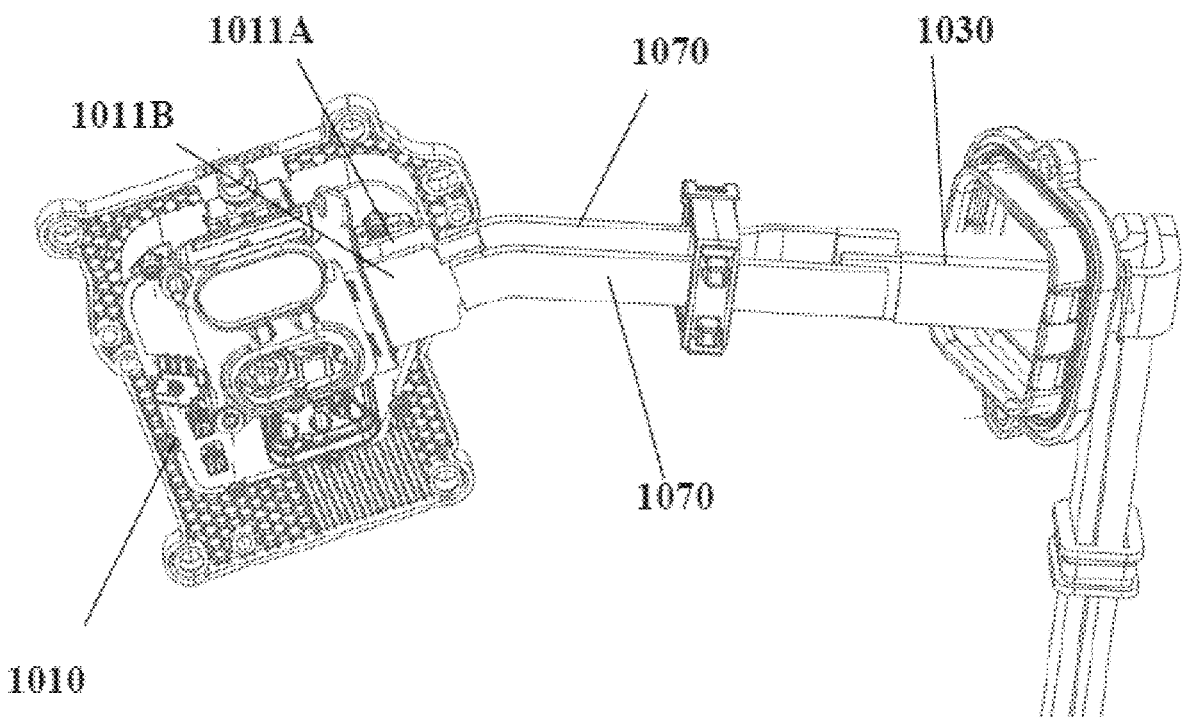
FIGS. 12A and 12B show the flexible connection between the aluminum busbar and the charging base connector, which is implemented based on the flexible connection section according to some embodiments.
Figure 12B:
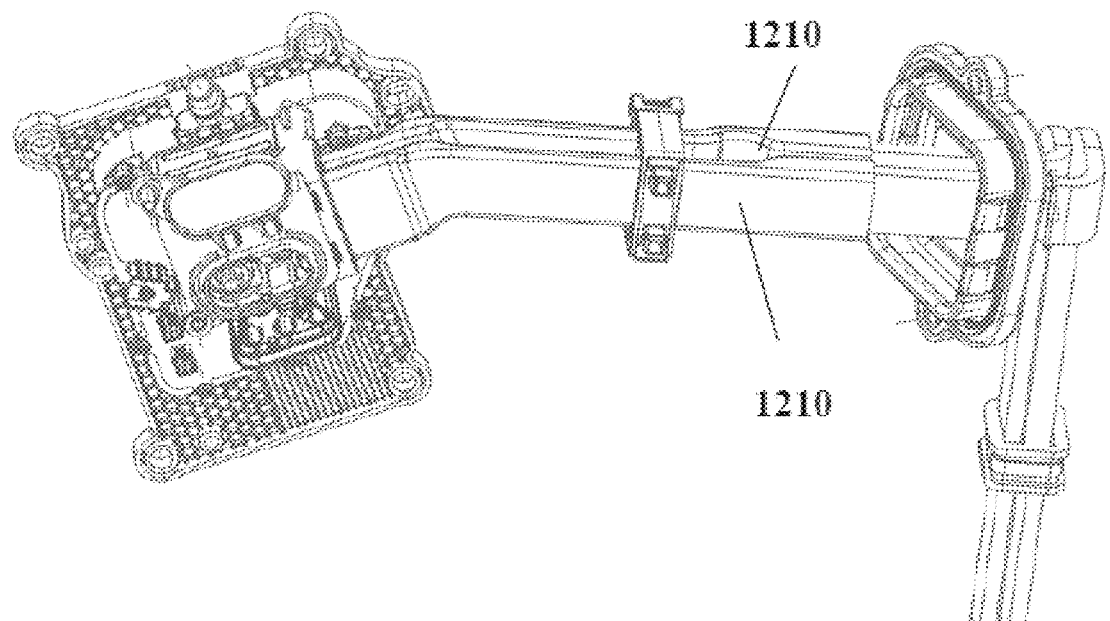

FIGS. 12A and 12B show that the flexible connection between the aluminum busbar 1030 and the charging base connector 1010 is implemented based on the flexible connection section 1070. As is shown in FIG. 12A, after the two flexible sections 1070 are appropriately positioned, the ends of them at one end are respectively soldered to the two copper sheet terminals 1011A and 1011B at the terminal ends of the charging base connector 1010, and the ends of them at the other end are respectively soldered to two aluminum busbars 1030. As is shown in FIG. 12B, after the soldering is completed, heat shrink tube 1210 is utilized to protect the entire flexible connection section 1070 and the weld area at both ends.

Figure 13A:
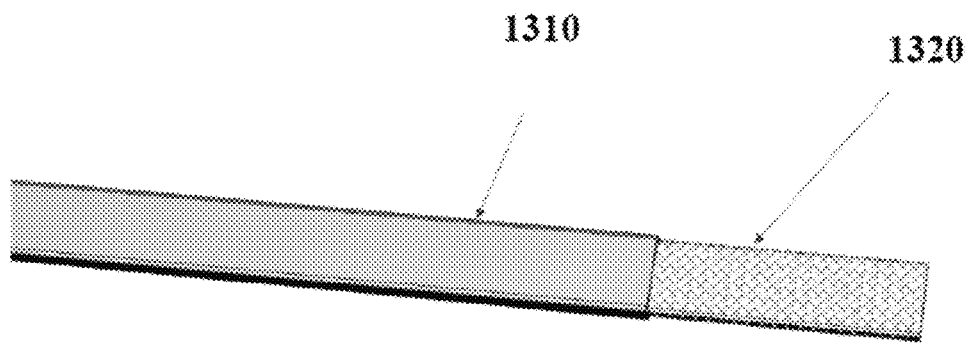
FIGS. 13A-13B show an implementation of a flexible connection section according to some embodiments.
Figure 13B:
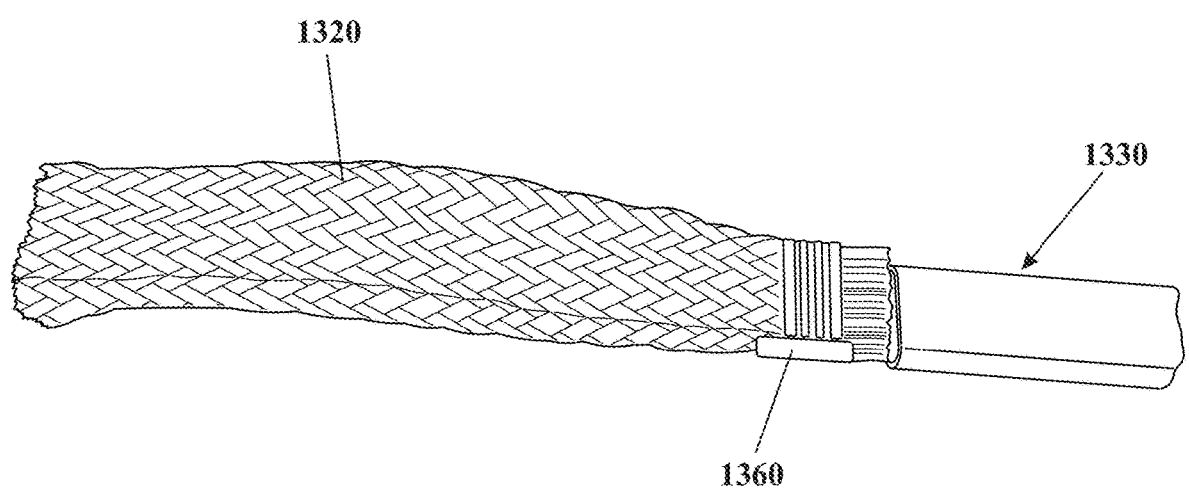
Figure 14:
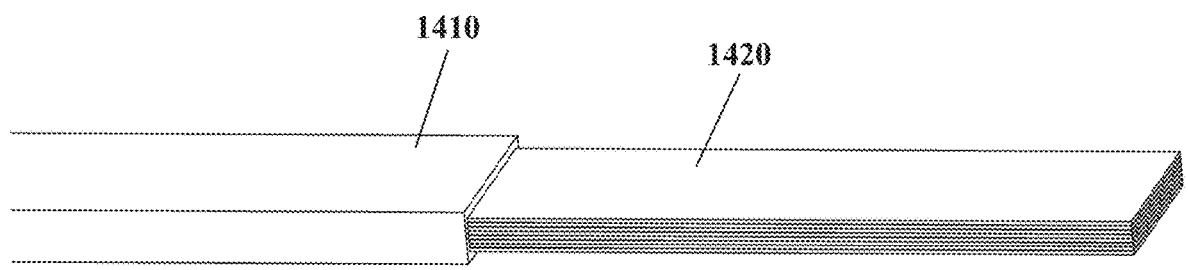
FIG. 14 shows an implementation of a flexible connection section according to some embodiments.
Figure 15A:
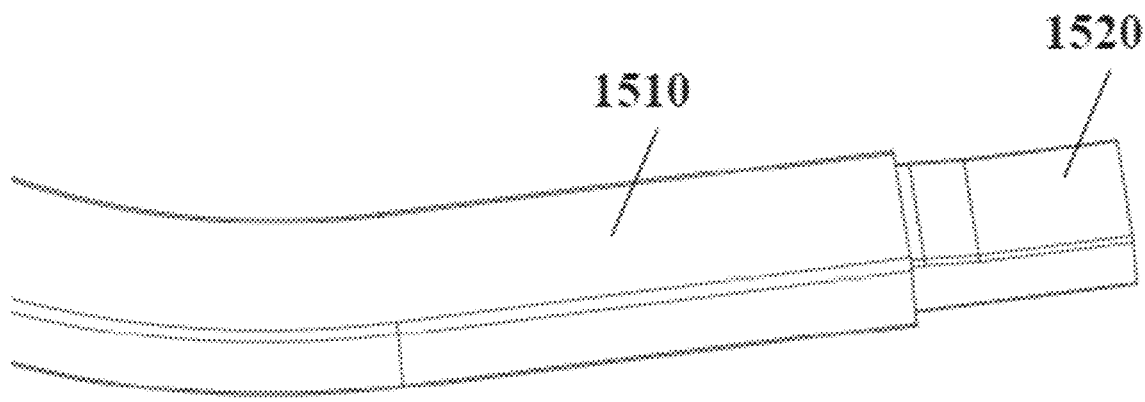
FIGS. 15A and 15B show an implementation of a flexible connection section according to some embodiments.
Figure 15B:
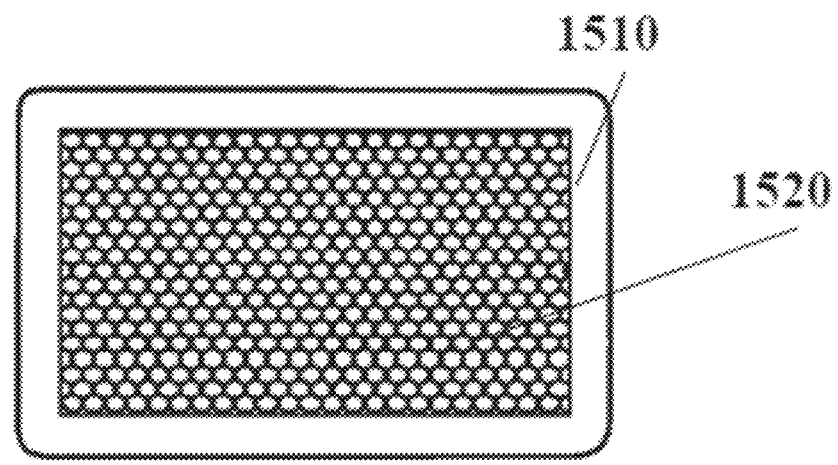

The flexible connection section 1070 may be any electrically conductive material that has suitable flexibility and that may be soldered to the aluminum busbar and the copper sheet terminals. As an example, as is shown in FIG. 13A, the flexible connection section may include a copper braided wire 1320 and an external insulating layer 1310, and as is shown in FIG. 13B, the copper braided wire 1320 is connected to the rigid aluminum row 1330, at area 1360, by ultrasonically welding. As another example, as is shown in FIG. 14, the flexible connection section may include a stacked busbar 1420 and an outer insulating layer 1410, wherein the stacked busbar 1420 may be made of several layers of copper or aluminum foil laminated together, and the insulating layer 1410 may adopt heat shrink tube, or may be extruded with XLPE, PVC, PA12 materials, etc. Per another example shown in FIG. 15A, the flexible connection section may include a flat copper or aluminum wire 1520 and an outer insulating layer 1510, and as is shown in FIG. 15B, the flat copper or aluminum wire may be a plurality of copper or aluminum filaments.

Although FIGS. 10A to 15B describe embodiments in which flexible connection section is adopted to absorb positioning tolerances by taking an aluminum busbar as an example, it will be understood that the flexible connection section may also be adopted to absorb positioning tolerances in implementations wherein an aluminum rod is used.

Example 4—Other Suitable Implementations

As is described above, in order to overcome the problem identified in applications, embodiments of the present application propose a solution to add a flexible connection section between the rigid conductor and the connector. It can be understood that the conception of employing a flexible connection section described above can replace or refine the connections shown in FIGS. 3 and 7, thereby improving the previously described "Example 1—Aluminum Busbar-Based Charging Wire Harness" and "Example 2—Aluminum Rod-Based Charging Wire Harness", however the improvements of the present invention are not limited to being applicable to these two wire harnesses.

Although the solution of adopting a flexible connection section to absorb the positioning tolerance is described by taking the charging base connector end as an example, it is understood that a flexible connection section may be adopted, as desired, at the battery connector end to absorb the positioning tolerance.

Further embodiments may encompass any automotive wire harness with a rigid conductor section (thereby having a large mounting and positioning tolerance to be addressed). Such an automotive wire harness may not be limited to charging wire harness and may be other wire harness products in the power supply or signal architecture system of an automotive.

The term "automotive" used herein shall be understood in a broad sense and shall be capable of encompassing a wide range of vehicles and land transportation.

The basic concepts have been described above, and it is clear for those skilled in the art that, the disclosure above is only an example and does not limit the present patent application. Although not explicitly stated herein, those skilled in the art may make various modifications, improvements, and amendments to the present patent application. Such modifications, improvements and amendments are recommended in the present patent application, so such modifications, improvements and amendments still fall into the spirit and scope of the embodiments of the present patent application.

The invention claimed is:

1. An automotive wire harness, comprising:
a conductive segment having a rigid conductor;
a first connector connected to a first end of the rigid conductor;
a second connector connected to a second end of the rigid conductor; and
a flexible connection section connecting the first end of the rigid conductor and the first connector, wherein the automotive wire harness is an automotive charging wire harness.

2. The automotive wire harness according to claim 1, wherein the rigid conductor is a rigid aluminum conductor.

3. The automotive wire harness according to claim 2, wherein the rigid aluminum conductor is an aluminum busbar.

4. The automotive wire harness according to claim 2, wherein the rigid aluminum conductor is an aluminum rod.

5. The automotive wire harness according to claim 1, further comprising an additional flexible connection section to be used to connect the second end of the rigid conductor to the second connector.

6. The automotive wire harness according to claim 1, wherein the rigid conductor is a busbar.

7. The automotive wire harness according to claim 1, wherein the rigid conductor is a rod.

8. An automotive wire harness, comprising:
a conductive segment having a rigid conductor;
a first connector connected to a first end of the rigid conductor, wherein the first connector is a charging base connector;
a second connector connected to a second end of the rigid conductor; and
a flexible connection section connecting the first end of the rigid conductor and the first connector.

9. The automotive wire harness according to claim 8, wherein the automotive wire harness is an automotive charging wire harness.

10. The automotive wire harness according to claim 8, wherein the second connector is a battery connector.

11. The automotive wire harness according to claim 8, wherein said connection section comprises a laminate of copper foil.

12. The automotive wire harness according to claim 8, wherein said connection section comprises a laminate of aluminum foil.

13. An automotive wire harness, comprising:
a conductive segment having a rigid conductor;
a first connector connected to a first end of the rigid conductor;
a second connector connected to a second end of the rigid conductor; and
a flexible connection section connecting the first end of the rigid conductor and the first connector, the flexible connection section comprising a flexible conductor having a plurality of filaments.

14. The automotive wire harness of claim 13, wherein said flexible conductor comprises braided wire filaments.

15. The automotive wire harness according to claim 13, wherein the flexible conductor comprises a flat copper wire.

16. The automotive wire harness according to claim 15, wherein the flat copper wire comprises a plurality of copper filaments.

17. The automotive wire harness according to claim 13, wherein the flexible conductor comprises an aluminum wire.

18. The automotive wire harness according to claim 17, wherein the aluminum wire comprises a plurality of aluminum filaments.

19. The automotive wire harness according to claim 13, wherein the flexible conductor comprises an insulating layer.

* * * * *